US007030747B2

(12) United States Patent
Scott et al.

(10) Patent No.: US 7,030,747 B2
(45) Date of Patent: Apr. 18, 2006

(54) METHOD AND SYSTEM FOR INTEGRATED ALARMS IN A PROCESS CONTROL SYSTEM

(75) Inventors: Cindy Scott, Georgetown, TX (US); Robert Havekost, Elgin, TX (US); Todd Reeves, Knoxville, TN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 192 days.

(21) Appl. No.: 10/787,383

(22) Filed: Feb. 26, 2004

(65) Prior Publication Data

US 2005/0190054 A1 Sep. 1, 2005

(51) Int. Cl.
G08B 29/00 (2006.01)
(52) U.S. Cl. .......................... 340/506; 340/525; 700/17
(58) Field of Classification Search ................. 340/506
See application file for complete search history.

(56) References Cited

U.S. PATENT DOCUMENTS

| 4,527,271 A | 7/1985 | Hallee et al. |
|---|---|---|
| 4,607,325 A | 8/1986 | Horn |
| 4,657,179 A | 4/1987 | Aggers et al. |
| 4,734,873 A | 3/1988 | Malloy et al. |
| 4,763,243 A | 8/1988 | Barlow et al. |
| 4,764,862 A | 8/1988 | Barlow et al. |
| 4,885,694 A | 12/1989 | Pray et al. |
| 4,907,167 A | 3/1990 | Skeirik |
| 4,910,691 A | 3/1990 | Skeirik |
| 4,944,035 A | 7/1990 | Aagardl et al. |
| 4,956,793 A | 9/1990 | Bonne et al. |
| 4,965,742 A | 10/1990 | Skeirik |
| 5,006,992 A | 4/1991 | Skeirik |
| 5,008,810 A | 4/1991 | Kessel et al. |
| 5,015,934 A | 5/1991 | Holley et al. |
| 5,018,215 A | 5/1991 | Nasr et al. |
| 5,043,863 A | 8/1991 | Bristol et al. |
| 5,050,095 A | 9/1991 | Samad |

(Continued)

FOREIGN PATENT DOCUMENTS

GB 2 341 524 3/2000

(Continued)

OTHER PUBLICATIONS

Search Report under Section 17(5) issued in GB 0503670.2 application by United Kingdom Patent Office on Jul. 18, 2005.

*Primary Examiner*—Jeffery Hofsass
(74) *Attorney, Agent, or Firm*—Marshall, Gerstein & Borun LLP

(57) ABSTRACT

A method and system for integrating alarms is provided. An external alarm is received at a process control system and includes an external tag. An internal alarm that is associated with the external alarm is determined based on a map. An internal tag associated with the external tag is also determined based on the map. The process control system generates the internal alarm which includes the internal tag and is based on the external alarm. A method and system for generating alarm and tag relations is also provided. At least one external tag associated with an external system is selected. At least one internal tag associated with a process control system related to the external tags is determined. At least one entry in a map is generated to indicate a relation between at least one of the external tags and at least one of the internal tags. At least one external alarm associated with the external system is selected and at least one internal alarm related to the external alarms is determined. At least one entry is generated in the map to indicate a relation between at least one of the external alarms and at least one of the internal alarms.

34 Claims, 5 Drawing Sheets

U.S. PATENT DOCUMENTS

| | | |
|---|---|---|
| 5,070,458 A | 12/1991 | Gilmore et al. |
| 5,121,467 A | 6/1992 | Skeirik |
| 5,134,574 A | 7/1992 | Beaverstock et al. |
| 5,140,530 A | 8/1992 | Guha et al. |
| 5,142,612 A | 8/1992 | Skeirik |
| 5,161,013 A | 11/1992 | Rylander et al. |
| 5,167,009 A | 11/1992 | Skeirik |
| 5,187,674 A | 2/1993 | Bonne |
| 5,193,143 A | 3/1993 | Kaemmerer et al. |
| 5,197,114 A | 3/1993 | Skeirik |
| 5,212,765 A | 5/1993 | Skeirik |
| 5,224,203 A | 6/1993 | Skeirik |
| 5,282,261 A | 1/1994 | Skeirik |
| 5,291,190 A | 3/1994 | Scarola et al. |
| 5,301,101 A | 4/1994 | MacArthur et al. |
| 5,311,447 A | 5/1994 | Bonne |
| 5,333,298 A | 7/1994 | Bland et al. |
| 5,351,184 A | 9/1994 | Lu et al. |
| 5,353,207 A | 10/1994 | Keeler et al. |
| 5,369,599 A | 11/1994 | Sadjadi et al. |
| 5,373,452 A | 12/1994 | Guha |
| 5,384,698 A | 1/1995 | Jelinek |
| 5,390,326 A | 2/1995 | Shah |
| 5,396,415 A | 3/1995 | Konar et al. |
| 5,398,303 A | 3/1995 | Tanaka |
| 5,408,406 A | 4/1995 | Mathur et al. |
| 5,442,544 A | 8/1995 | Jelinek |
| 5,461,570 A | 10/1995 | Wang et al. |
| 5,486,920 A | 1/1996 | Killpatrick et al. |
| 5,486,996 A | 1/1996 | Samad et al. |
| 5,488,697 A | 1/1996 | Kaemmerer et al. |
| 5,499,188 A | 3/1996 | Kline, Jr. et al. |
| 5,521,814 A | 5/1996 | Teran et al. |
| 5,537,310 A | 7/1996 | Tanake et al. |
| 5,541,833 A | 7/1996 | Bristol et al. |
| 5,546,301 A | 8/1996 | Agrawal et al. |
| 5,559,690 A | 9/1996 | Keeler et al. |
| 5,561,599 A | 10/1996 | Lu |
| 5,566,065 A | 10/1996 | Hansen et al. |
| 5,570,282 A | 10/1996 | Hansen et al. |
| 5,572,420 A | 11/1996 | Lu |
| 5,574,638 A | 11/1996 | Lu |
| 5,596,704 A | 1/1997 | Geddes et al. |
| 5,631,825 A | 5/1997 | van Weele et al. |
| 5,640,491 A | 6/1997 | Bhat et al. |
| 5,666,297 A | 9/1997 | Britt et al. |
| 5,687,090 A | 11/1997 | Chen et al. |
| 5,691,895 A | 11/1997 | Kurtzberg et al. |
| 5,692,158 A | 11/1997 | Degeneff et al. |
| 5,704,011 A | 12/1997 | Hansen et al. |
| 5,715,158 A | 2/1998 | Chen |
| 5,729,661 A | 3/1998 | Keeler et al. |
| 5,740,324 A | 4/1998 | Mathur et al. |
| 5,742,513 A | 4/1998 | Bouhenguel et al. |
| 5,754,451 A | 5/1998 | Williams |
| 5,761,518 A | 6/1998 | Boehling et al. |
| 5,764,891 A | 6/1998 | Warrior |
| 5,777,872 A | 7/1998 | He |
| 5,781,432 A | 7/1998 | Keeler et al. |
| 5,790,898 A | 8/1998 | Kishima et al. |
| 5,796,609 A | 8/1998 | Tao et al. |
| 5,798,939 A | 8/1998 | Ochoa et al. |
| 5,805,442 A | 9/1998 | Crater et al. |
| 5,809,490 A | 9/1998 | Guiver et al. |
| 5,819,050 A | 10/1998 | Boehling et al. |
| 5,819,232 A | 10/1998 | Shipman |
| 5,825,645 A | 10/1998 | Konar et al. |
| 5,826,249 A | 10/1998 | Skeirik |
| 5,842,189 A | 11/1998 | Keeler et al. |
| 5,847,952 A | 12/1998 | Samad |
| 5,859,773 A | 1/1999 | Keeler et al. |
| 5,859,964 A | 1/1999 | Wang et al. |
| 5,877,954 A | 3/1999 | Klimasauskas et al. |
| 5,892,679 A | 4/1999 | He |
| 5,892,939 A | 4/1999 | Call et al. |
| 5,898,869 A | 4/1999 | Anderson |
| 5,901,058 A | 5/1999 | Steinman et al. |
| 5,907,701 A | 5/1999 | Hanson |
| 5,909,370 A | 6/1999 | Lynch |
| 5,909,541 A | 6/1999 | Sampson et al. |
| 5,909,586 A | 6/1999 | Anderson |
| 5,917,840 A | 6/1999 | Cheney et al. |
| 5,918,233 A | 6/1999 | La Chance et al. |
| 5,924,086 A | 7/1999 | Mathur et al. |
| 5,940,290 A | 8/1999 | Dixon |
| 5,948,101 A | 9/1999 | David et al. |
| 5,949,417 A | 9/1999 | Calder |
| 5,960,214 A | 9/1999 | Sharpe, Jr. et al. |
| 5,960,441 A | 9/1999 | Bland et al. |
| 5,975,737 A | 11/1999 | Crater et al. |
| 5,984,502 A | 11/1999 | Calder |
| 5,988,847 A | 11/1999 | McLaughlin et al. |
| 5,995,916 A | 11/1999 | Nixon et al. |
| 5,997,167 A | 12/1999 | Crater et al. |
| 6,008,985 A | 12/1999 | Lake et al. |
| 6,017,143 A | 1/2000 | Eryurek et al. |
| 6,026,352 A | 2/2000 | Burns et al. |
| 6,033,257 A | 3/2000 | Lake et al. |
| 6,038,486 A | 3/2000 | Saitoh et al. |
| 6,041,263 A | 3/2000 | Boston et al. |
| 6,047,221 A | 4/2000 | Piche et al. |
| 6,055,483 A | 4/2000 | Lu |
| 6,061,603 A | 5/2000 | Papadopoulos et al. |
| 6,067,505 A | 5/2000 | Bonoyer et al. |
| 6,076,124 A | 6/2000 | Korowitz et al. |
| 6,078,843 A | 6/2000 | Shavit |
| 6,093,211 A | 7/2000 | Hamielec et al. |
| 6,106,785 A | 8/2000 | Havlena et al. |
| 6,108,616 A | 8/2000 | Borchers et al. |
| 6,110,214 A | 8/2000 | Klimasauskas |
| 6,122,555 A | 9/2000 | Lu |
| 6,128,279 A | 10/2000 | O'Neil et al. |
| 6,266,726 B1 | 7/2001 | Nixon et al. |
| 6,298,377 B1 | 10/2001 | Hartikainen et al. |
| 6,298,454 B1 | 10/2001 | Schleiss et al. |
| 6,317,701 B1 | 11/2001 | Pyötsiä et al. |
| 6,332,110 B1 | 12/2001 | Wolfe |
| 6,421,571 B1 | 7/2002 | Spriggs et al. |
| 6,446,202 B1 | 9/2002 | Krivoshein et al. |
| 6,529,780 B1 | 3/2003 | Soergel et al. |
| 6,535,769 B1 | 3/2003 | Konar |
| 6,609,040 B1 | 8/2003 | Brünnemann |
| 6,628,994 B1 | 9/2003 | Turicchi et al. |
| 6,633,782 B1 | 10/2003 | Schleiss et al. |
| 6,738,388 B1 | 5/2004 | Stevenson et al. |
| 6,774,786 B1 | 8/2004 | Havekost et al. |
| 2002/0077711 A1 | 6/2002 | Nixon et al. |
| 2002/0082734 A1* | 6/2002 | Amrhein et al. ............ 700/103 |
| 2002/0082737 A1* | 6/2002 | Amrhein et al. ............ 700/108 |
| 2003/0014500 A1 | 1/2003 | Schleiss et al. |

FOREIGN PATENT DOCUMENTS

| | | |
|---|---|---|
| JP | 5020577 | 1/1993 |

* cited by examiner

METHOD AND SYSTEM FOR INTEGRATED ALARMS IN A PROCESS CONTROL SYSTEM

TECHNICAL FIELD

The present disclosure generally relates to process control systems and, more particularly, to integrated alarms within the process control system.

BACKGROUND

As computers have grown increasingly important in today's society, so has the importance of computers in process control systems. Process control systems control and monitor the operation of valves, actuators, transmitters, flowmeters, and other process control and monitoring devices. Often, process control systems are used in association with other monitoring and testing systems. Such other systems often have their own displays and user interfaces which are typically separate from the process control system, and may lack the ability to communicate with the process control system.

Factories and other production plants are commonly used to create a variety of products. Process control systems, such as those provided by Fisher-Rosemount Systems, Inc., an Emerson Process Management company, are widely used in such factories and/or plants in which products are manufactured or processes are controlled (e.g., chemical manufacturing, power plant control, etc.) Process control systems are also used in the harvesting of natural resources such as, for example, oil and gas drilling and handling processes, etc. Virtually any manufacturing process, resource harvesting process, etc. can be automated through the application of one or more process control systems.

The manner in which process control systems are implemented has evolved over the years. Older generations of process control systems were typically implemented using dedicated, centralized hardware. However, modern process control systems are typically implemented using a highly distributed network of workstations, intelligent controllers, smart field devices, and the like, some or all of which may perform a portion of an overall process control strategy or scheme.

Often, process control systems are used in conjunction with external monitoring and testing equipment that is separate from the process control system as part of an overall automation system at a plant. For example, a process control system may control the operation and output of a turbine while separate vibration monitoring equipment may be used to monitor the operational health of the turbine. For another example, testing equipment, such as a valve testing device, may be periodically connected to field devices and use its own integrated display system for output. These external systems are unable to communicate with the process control system which limits access to alarms and other information generated by the external system to the external system itself and prevents access from the process control system.

One traditional technique for communicating information from the external system to the process control system has been for the control system to save the alarm changes generated by the external system in a chronologically ordered log file. For example, the Alarms and Events Custom Interface Standard from the Object Linking and Embedding (OLE) for Process Control (OPC) Foundation defines a common format for reporting alarm changes in a log file to support access to the alarms history by various applications.

Such a reporting technique has various uses and drawbacks. One important use is to allow an external system to maintain an electronic chronological log of alarm activity. One significant drawback is that the external system only sends alarm information to the log file when an alarm changes which prevents synchronization between the process control system and the external system to show the alarms that are currently active. For example, if the external system and the process control system lose communication temporarily, alarm changes may be missed and the current, correct status of the alarm may be lost. Also, important alarms are typically difficult to separate from minor alarms due to the layout of the log file and that different systems may prioritize their alarms differently. Different prioritization techniques may cause alarms from some systems to be biased as compared to other systems.

SUMMARY

The present disclosure supports the ability to integrate external alarms from external equipment, such as a vibration monitoring system, into a process control system. In one embodiment, the external alarms may be stored in a log file or other database while the process control system maps the external alarms into internal alarms for display in the process control system. In another embodiment, a device or loop tag associated with the external alarm is mapped into an internal tag used by the process control system and an internal alarm is generated for that internal tag. For example, a single field device may be both monitored by an external system and controlled by the process control system, but have different tags in the different systems. By mapping the different tags into a single tag, an operator of the process control system is provided with a more uniform and unified system for managing and displaying alarms from different systems.

The present disclosure provides various technical advantages. Various embodiments may provide all, some or none of these technical advantages. One such technical advantage is the capability to integrate alarms from external systems into a process control system for handling in the process control system. Integrating alarms from multiple systems at a single system provides a more consistent user interface and allows more centralization of alarms. By handling alarms from both an external system and a process control system in a centralized manner, decreased cost and increased efficiency may be achieved.

DETAILED DESCRIPTION

Figure 1:
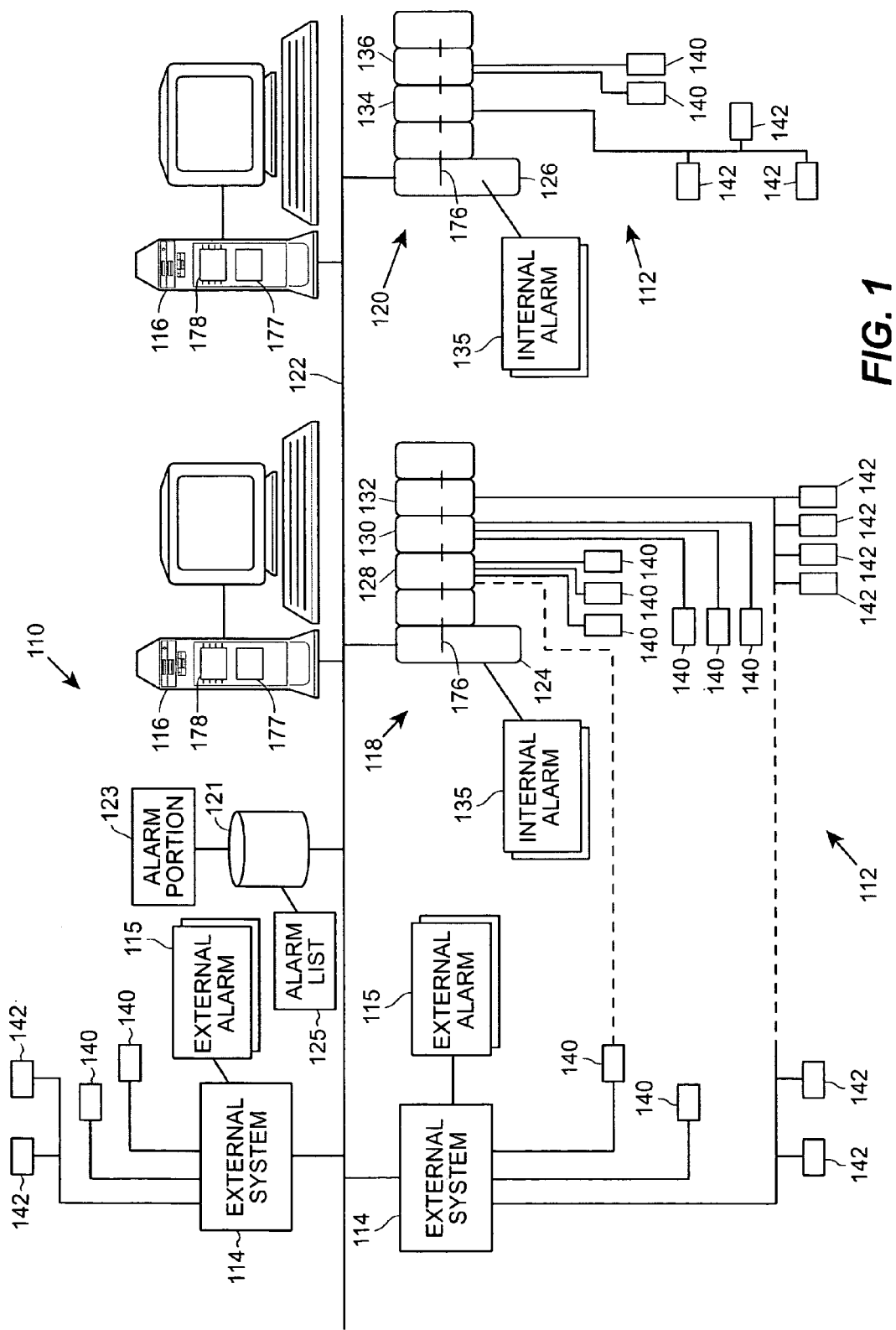
FIG. 1 is a diagram illustrating a process control system according to one embodiment of the present disclosure.

FIG. 1 illustrates an integrated process control system according to one embodiment of the present disclosure. In particular, as illustrated in FIG. 1, a process plant 110 includes a process control system 112 and one or more external systems 114. The process control system 112 may include hardware and/or software operable to control, command, monitor, test, communicate with and/or otherwise use one or more field devices 140 and 142. For example, the process control system 112 may be the DeltaV™ system sold by Emerson Process Management.

The external systems 114 may include hardware and/or software operable to monitor, control, test, or otherwise interact with field devices 140 and 142. Often the external systems 114 provide capabilities not supported by the process control system. For example, a vibration monitoring system may be used to monitor vibration in a turbine controlled by the process control system 112. The external systems 114 may monitor, control or otherwise interact with field devices 140 and 142 that may or may not also be controlled by the process control system 112. For brevity, the external system 114 may be referred to hereinafter as "monitoring" a field device, however, it should be understood that the external system 114 may also or alternatively be performing other, non-monitoring activities.

The external systems 114 are further operable to generate one or more external alarms 115. The external alarms 115 may include information about the field devices 140 and 142, such as problems, maintenance information, failures, advisories, and other information to be reported to an operator, maintenance personnel or other personnel. The external alarms 115 may indicate any one or more of a particular field device 140 or 142 associated with the alarm, such as by tag, a severity of the alarm, a description of the alarm, a type of the alarm, such as failure or maintenance, and a time when the alarm was generated. In general, the external alarms 115 may include any suitable information for communicating or indicating information related to the field devices 140 and 142 associated with the external system 114.

The process plant 110 also includes one or more host workstations, computers or user interfaces 116 (which may be any type of personal computers, workstations, PDAs, etc.) which are accessible by plant personnel, such as process control operators, maintenance personnel, etc. In the example illustrated in FIG. 1, two user interfaces 116 are shown as being connected to two separate process control nodes 118 and 120 and to a database 121 via a common communication line or bus 122. The communication network 122 may be implemented using any desired bus-based and/or non-bus based hardware, using any desired hardwired and/or wireless communication structure and/or using any desired or suitable communication protocol, such as an Ethernet protocol, in any suitable combination.

Database 121 further includes an alarm portion 123 operable to store external alarms 115 received from external systems 114 over bus 122. In one embodiment, the alarm portion 123 stores an alarm list 125 including active external alarms 115 and periodically compares and updates the alarm list 125 based on the alarm detected in the external system. In one embodiment, the alarm list 125 includes the time of the external alarm 115, an external tag name and a name for the external alarm 115. In other embodiments, other suitable information may also be included. Also, the alarm list may use standard technologies such as the extensible markup language (XML) or the Alarms and Events Custom Interface Standard by the OPC Foundation, either alone, or in combination with proprietary technologies to create and maintain the alarm list 125.

Generally speaking, each of the nodes 18 and 120 of the process plant 110 includes process control system devices connected together via a bus or other structure that may be provided on a backplane into which the different devices are attached. The node 118 is illustrated in FIG. 1 as including a process controller 124 (which may be a redundant pair of controllers) as well as one or more process control system input/output (I/O) devices 128, 130 and 132 while the node 120 is illustrated as including a process controller 126 (which may be a redundant pair of controllers) as well as one or more process control system I/O devices 134 and 136. Each of the process control system I/O devices 128, 130, 132, 134 and 136 is communicatively connected to a set of process control related field devices, illustrated in FIG. 1 as field devices 140 and 142. The process controllers 124 and 126, the I/O devices 128–136 and the controller field devices 140 and 142 generally make up the process control system 112.

The process controllers 124 and 126, which may be, by way of example only, DeltaV™ controllers sold by Emerson Process Management or any other desired type of process controllers, are programmed to provide process control functionality (using what are commonly referred to as control modules) using the I/O devices 128, 130 and 132 (for the controller 124), the I/O devices 134 and 136 (for the controller 126) and the field devices 140 and 142. In particular, each of the controllers 124 and 126 implements or oversees one or more process control routines (which are software objects and may be made up of a collection of interconnected software objects) stored therein or otherwise associated therewith and communicates with the field devices 140 and 142 and the workstations 116 to control the process plant 110 or a portion of the process plant 110 in any desired manner.

The controllers 124 and 126 may further receive or generate one or more internal alarms 135 associated with the field devices 140 and 142. The internal alarms 135 may include failure, maintenance, current state and/or other suitable information associated with the field devices 140 and 142, such as a tag identifying the field device, a severity indication, a priority indication, a description, whether the alarm is a failure, advisory or maintenance alarm, and a time when the alarm was generated. For example, the internal alarm 135 may indicate that a particular field device has failed and that the alarm indicating the failure has not been acknowledged by an operator. Generally, any suitable format and information may be included in the internal alarms 135.

The field devices 140 and 142 may be any desired types of field devices, such as sensors, valves, transmitters, positioners, etc., and may conform to any desired open, proprietary or other communication or programming protocol including, for example, the HART or the 4–20 mA protocol (as illustrated for the field devices 140), any fieldbus protocol such as the FOUNDATION® Fieldbus protocol (as illustrated for the field devices 142), or the CAN, Profibus, the AS-Interface protocols, to name but a few. Similarly, the I/O devices 128–136 may be any known types of process control I/O devices using any appropriate communication protocol(s).

A common backplane 176 (indicated by a dashed line through the controllers 124, 126, and the I/O devices 128–136), may be used, in one embodiment, in each of the nodes 118 and 120 to connect the controllers 124 and 126 to the process control I/O cards 128, 130 and 132 or 134 and 136. The controllers 124 and 126 may also be, in one embodiment, communicatively coupled to, and may operate as a bus arbitrator for the bus 122, to enable each of the I/O devices 128–136 to communicate with any of the workstations 116 via the bus 122.

As will be understood, each of the workstations 116 includes a processor 177 and a memory 178. The processor 177 may comprise any suitable electronic or other processing device operable to communicate with memory 178 and execute software at workstation 116. The memory 178 may include any suitable electronic, magnetic, optical or other transient and/or persistent storage operable to store data and/or instructions. For example, the processor 176 may comprise a general purpose central processing unit (CPU), an application specific integrated circuit (ASIC) or a field programmable gate array (FPGA). For another example, the memory 178 may include random access memory (RAM), read only memory (ROM), CD-ROMs, Digital Versatile Disks (DVDs) and/or magnetic disk drives.

In operation, the process control system 112 controls and operates plant 110 and field devices 140 and 142. Substantially simultaneously, the external system 1–14 may monitor all or any portion of the field devices 140 and 142. Also, the external system 114 and process control system 112 may monitor and control various field devices independently of each other. It should be understood that the external system 114 may perform suitable operations with respect to the field devices 140 and 142 other than monitoring, such as control or testing. The external system 114 may identify situations associated with field devices 140 and 142 to be communicated to operations and/or maintenance personnel and generate one or more external alarms 115 for display in the external system 114. The external alarms 115 may then be communicated across the communication bus 122 to the alarm portion 123 of database 121.

The process controller 124 then reads the external alarms 115 from the alarm portion 123 and maps the external alarms 115 into internal alarms 135. The appropriate internal alarms 135 are then generated by the processor controller 124 based on the external alarms 115 and displayed on the workstation 116 by the process control system 112. Alternatively, the external alarm 115 may be communicated directly to the process controller 124 over the communication bus 122 or using an alternative communication link. Once the internal alarm 135 has been displayed on the workstation 116, the operator can interact with the internal alarm 135 in generally the same way as the operator would interact with normal internal alarms. Thus, the operator can handle alarms from external systems 114 using a generally consistent user interface. For example, techniques, such as those disclosed in U.S. patent application Ser. No. 09/953,811 (filed Sep. 17, 2001) which is incorporated by reference herein, may be used. Further, once the internal alarm 135 has been handled at the process control system 112, the related external alarm 115 may be updated at the external system 114 using suitable techniques.

By providing the operator with a single, consistent user interface for handling alarms across both the process control system and the external system, increased efficiency may be realized. Further, by allowing the operator to handle alarms from multiple, diverse systems at a single console, for example, decreased costs may also be realized. Another advantage may be realized by allowing the use of capabilities provided by the process control system for alarm handling that may not be provided by the external system. For example, alarm prioritization may be supported by the process control system and not supported by the external system. For another example, the process control system may provide sorting capabilities and other useful capabilities, such as clicking on an alarm for information about the indicated field device, not supported by the external system that enhance the operator's ability to control the process plant. For yet another example, the process control system may provide communications to external devices, such as pagers or electronic mail, that are not supported by the external system.

Figure 2:
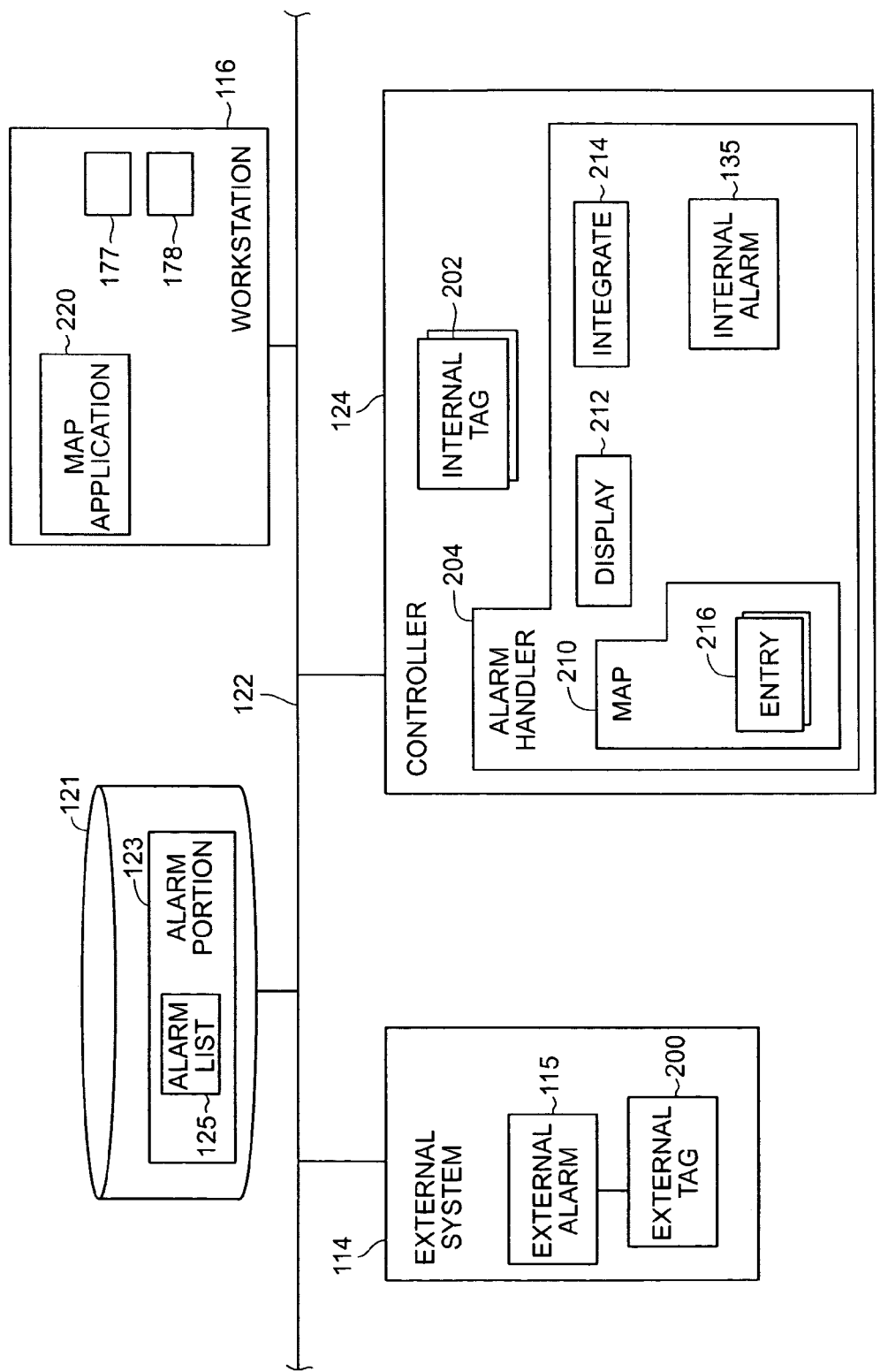
FIG. 2 is a block diagram illustrating further details of the process control system according to one embodiment of the present disclosure.

FIG. 2 is a block diagram illustrating further details of the process control system 110 according to one embodiment of the present disclosure. The external alarms 115 may each include a respective external tag 200. The external tag 200 may be used to identify a particular field device 140 or 142, such as the field device associated with the external alarm 115. The external tag 200 may also identify control loops or other elements associated with the external alarm 115. In general, the external tags 200 represent identifiers associated with the field devices 140 and 142, and process loops, associated with the external system 114.

The controller 124 may further include an alarm handler 204 and one or more internal tags 202. The internal tags 202 represent the identifiers associated with the field devices 140 and 142 controlled by controller 124. The internal tags 202 may be identical or distinct from the external tags 200. For example, a single field device 140 or 142 monitored by the external system 114 and controlled by the controller 124 may have two distinct tags associated with it, the external tag 200 and the internal tag 202. In general, the internal tags 202 may follow naming conventions required by the controller 124 and the process control system 112 while the external tags 200 may follow the naming conventions of the external system 114.

The alarm handler 204 comprises hardware and/or software operable to handle and generate the internal alarms 135 for the field devices 140 and 142 controlled by controller 124. It should be noted that the controller 126 may be configured similarly to the controller 124. In one embodiment, the alarm handler 204 comprises software respectively executed by the controllers 124 and 126 to generate and handle internal and external alarms associated with the filed devices 140 and 142 coupled to I/O devices 128, 130 and 132, and I/O devices 134 and 136. The alarm handler 204 further includes a alarm map 210, a display portion 212, and an integration portion 214.

The alarm map 210 includes data and information operable to allow the mapping of external alarms 115 into internal alarms 135. The map 210 may be further capable of mapping external tags 200 into existing internal tags 202 or by creating new internal tags 202 if no existing internal tag 202 is a suitable match for the external tag 200. In one embodiment, the map 210 is a extensible markup language (XML) file, but may alternatively use any suitable format, such as a database. Also, in various embodiments, the alarm portion 123 may include the alarm map 210 of external alarm to internal alarm.

The alarm map 210 further includes one or more entries 216. The entries 216 represent mappings between internal alarms 135 and external alarms 115, and between internal tags 202 and external tags 200. Each entry 216 may represent a one-to-one correspondence between internal alarms 135 and external alarms 115, or between internal tags 202 and external tags 200. Each entry may also or alternatively represent many-to-one relationships between internal and external tags 202 and 200, and internal and external alarms 135 and 115. For example, multiple external tags 200 associated with multiple monitoring points of a single field device, such as a turbine, represented by a single internal tag 202, may be mapped by a single entry 216 to the single internal tag 202. Another example could include multiple external alarms 115 mapped into a single internal alarm 135, where the different external alarms 115 may be distinguished within the internal alarm 135 by an associated description. The alarm map 210 may further include information indicating the logical or physical location, such as a section of the plant 110, for the external tags 200. For example, the location information may allow the operator to group the external tags 200 for security or alarm reporting purposes.

Also, the entries 216 may represent hierarchical and multi-level relationships between internal alarms 135, external alarms 115, internal tags 202 and external tags 200. For example, the mapping from the external alarm 115 to the internal alarm 135 may depend on the particular external tag 200 or internal tag 202. Another example involves the mapping from the external tag 200 to the internal tag 202 depending on the particular external alarm 115 or internal alarm 135.

Figure 3:
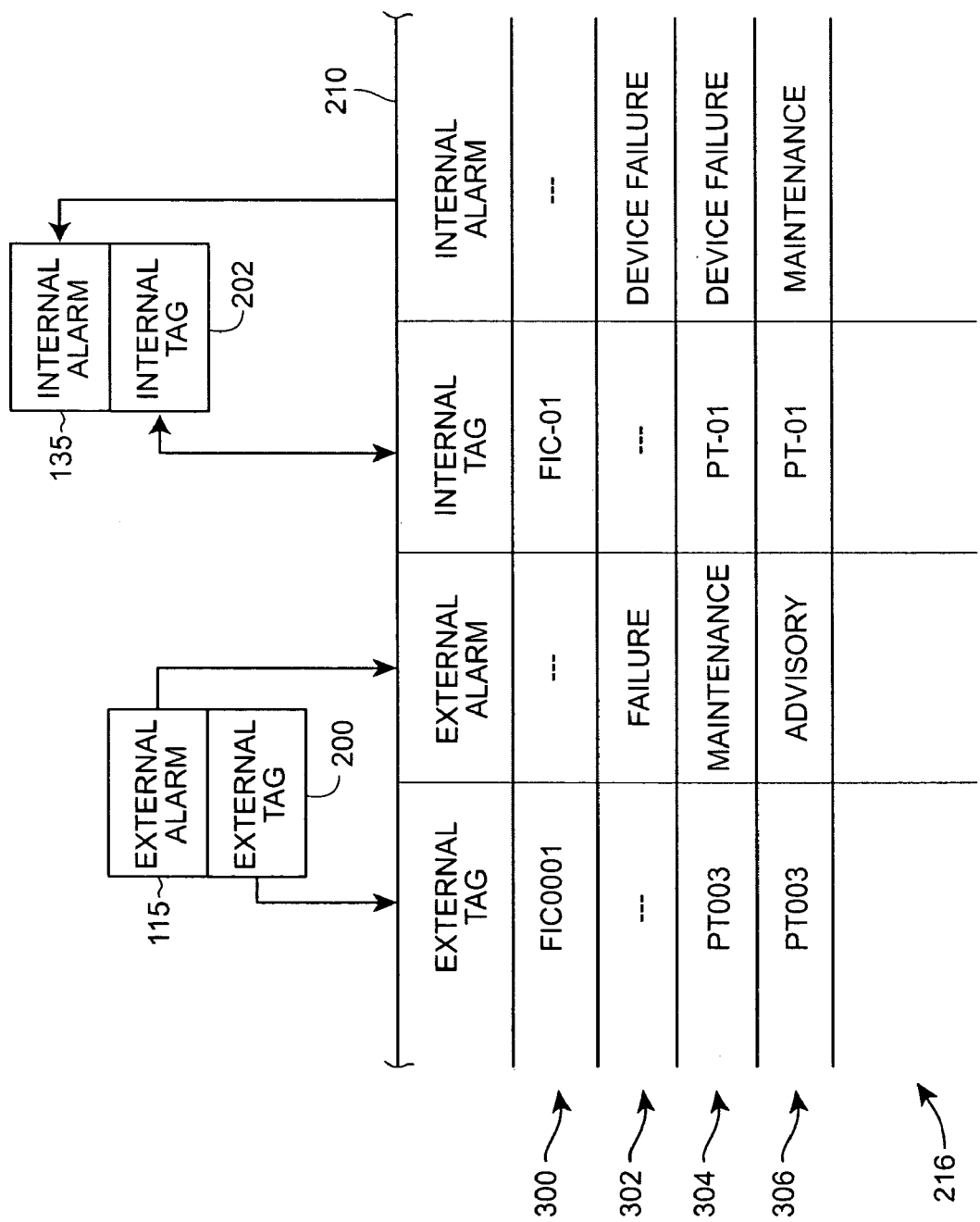
FIG. 3 is a block diagram illustrating a map used by the process control system according to one embodiment of the present disclosure.

FIG. 3 illustrates additional details of the entries 216 and map 210 according to one embodiment of the present invention. The illustrated map 210 includes three entries 216, entry 300, entry 302, entry 304 and entry 306. The entry 300 illustrates a mapping from the external tag "FIC0001" to the internal tag "FIC-01". Entry 300 may be used regardless of the external alarm 115 associated with the external tag "FIC0001" and rely upon default mapping rules, other entries 216, or other suitable techniques, for mapping between the external and internal alarms 135 and 115. The entry 302 illustrates a mapping of "failure" external alarms to "device failure" internal alarms regardless of the associated external tag 200. A mapping such as entry 302 may rely upon default mapping rules, other entries 216, or other suitable techniques, for mapping between the external and internal tags 200 and 202. For example, the entries 300 and 302 may be used together to handle the mapping for the external tag "FIC0001" and the external alarm of "failure" into internal tags 135 and internal tags 202. The entry 304 illustrates a mapping for the external tag "PT003" with an external alarm of "maintenance". An entry 216 such as entry 304 may be used to specify handling for a specific combination of external tag 200 and external alarm 115. Entry 306 may be used with entry 304 to handle different external alarms 115 for the external tag "PT003".

Returning to FIG. 2, the display portion 212 provides the alarm handler 204 with the ability to display the internal alarms 135 on the workstation 116. For example, the display portion 212 may provide formatting, positioning, font and other display support abilities for displaying the internal alarms 135 on the workstation 116.

The integration portion 214 includes software and/or hardware operable to access and use the map 210 to generate the internal alarm 135 with the appropriate internal tag 202 based on the external alarm 200 and external tag 202. More specifically, the integration portion 214 determines which internal alarms 135 to generate and which internal tags 202 to use with the external alarms 115 and external tags 202 based on map 210.

The alarm handler 204 may be operable to communicate with the external systems 114 to receive the external alarms 115 through the use of the alarm portion 123 and/or via a direct communications link, such as directly over bus 122 or via other suitable wireless or wireline data communication system and/or techniques. It should be noted that communication of external alarms 115 to alarm handler 204 may be accomplished in a suitable method other than the particular embodiments discussed herein.

The workstation 116 may further include a map application 220. The map application 220 and the alarm handler 204 may operate separately or in parallel as suitable. The map application 220 operates to generate and modify entries 216 in the alarm map 210. More specifically, the map application 220 may be software stored in memory 178 and executable by processor 177. In general, the map application 220 may use suitable techniques to generate entries 216 indicating the relationships between internal and external alarms 135 and 115, and internal and external tags 202 and 200. The map application 220 is described in more detail below in association with FIG. 4.

In operation, the external system 114 generates one or more external alarms 115 for the field devices 140 and/or 142 monitored by the external system 114. The external system 114 includes the external tag 200 in the external alarm 115 to identify the particular field device 140 or 142 associated with the external alarm 115. For example, the external system 114 may be a testing device, such as the FlowScanner™ product sold by Emerson Process Management, that determines that a field device, such as a valve, is close to failure or requires other maintenance and generate the appropriate external alarm 115 for the valve. Another example may include an external system 114 for monitoring the status of rotating equipment, such as a turbine, to determine if the turbine is in a dangerous state or where catastrophic failure may soon occur and for generating the appropriate external alarm 115 to indicate the critical status of the turbine.

The external system 114 then communicates the external alarm 115 and its associated external tag 200 to the controller 124. The external system 114 may communicate the external alarm 115 to the controller 124 directly via the bus 122, by storing the external alarm 115 in the alarm portion 123 or via another suitable technique. More specifically, in one embodiment, the external system 114 may extract information from the external alarm 115 and format the extracted information according to a predetermined standard. For example, the OPC Alarm and Events Standard may indicate the information to be extracted from the external alarm 115 and specify a standard format for communication with the controller 124 and other devices. The extracted information may include the external tag 200, whether the external alarm 115 is a failure, maintenance or advisory alarm, a description of the external alarm 115, and whether the external alarm 115 is active or inactive. This information may then be stored in a particular format, such as the format specified in the standard, in alarm portion 123. For example, an alarm log file may list the tag followed by "failure", "maintenance" or "advisory", a description, and "active" or "inactive". The external alarm 115 may also be reformatted into a particular or common format for communication across bus 122 to alarm handler 204.

The controller 124 then receives the external alarm 115. In one embodiment, the controller 124 polls the alarm portion 123 for additions and/or modifications to the alarm portion 123 at regular intervals, such as every second or every 5 minutes. In one embodiment, any polling time between 100 ms to 10 minutes may be selected. Generally, the polling time may be configured as suitable for the system 112 and plant 110. Alternatively, alarm portion 123 may notify controller 124 of the arrival of the external alarm 115 in portion 123. In another embodiment, controller 124 receives the external alarm 115 over the bus 122, by receiving the external alarm 115 without use of the alarm portion 123, such as the receipt of a software event or message at the controller 124.

The controller 124 then communicates the external alarm 115 to the alarm handler 204 for processing. For example, when the alarm handler 204 is software executing on the controller 124, the controller 124 may pass the received external alarm 115 to the alarm handler 204. The alarm handler 204 may then use the integration portion 214 and the map 210 to translate the external alarm 115 and associated external tag 200 into the corresponding internal tag (or tags) 202 and internal alarm (or alarms) 135. More specifically, the integration portion 214 uses the map 210 to determine which particular internal alarm 135 corresponds to particular external alarms 115. In one embodiment, the integration portion 214 looks at the information from alarm portion 123, such as failure, maintenance or advisory, and active or inactive, to determine the appropriate internal alarm 135 that corresponds to the particular failure, maintenance or advisory alarm. For example, an active external alarm describing a failure may be handled differently than an inactive external alarm for maintenance. For another example, multiple internal alarms 135 may be generated from a single external alarm 115 representing multiple issues, such as maintenance and advisory. The integration portion 214 may also apply any priorities, security restrictions, or other configuration specified by controller 124 for the particular internal alarm 135 to be generated. For example, the controller 124 may prioritize failure alarms higher than advisory alarms while the external system 114 has no such prioritization scheme.

The alarm handler 204 then generates the appropriate internal alarm 135 and displays the generated internal alarm 135 on the workstation 116. The display of the internal alarm 135 generated from the external alarm 115 may indicate that the internal alarm 135 was based on an external alarm 115, may be indistinguishable from other internal alarms 135, and/or be displayed in some other fashion based on the configuration of system 112.

Figure 4:
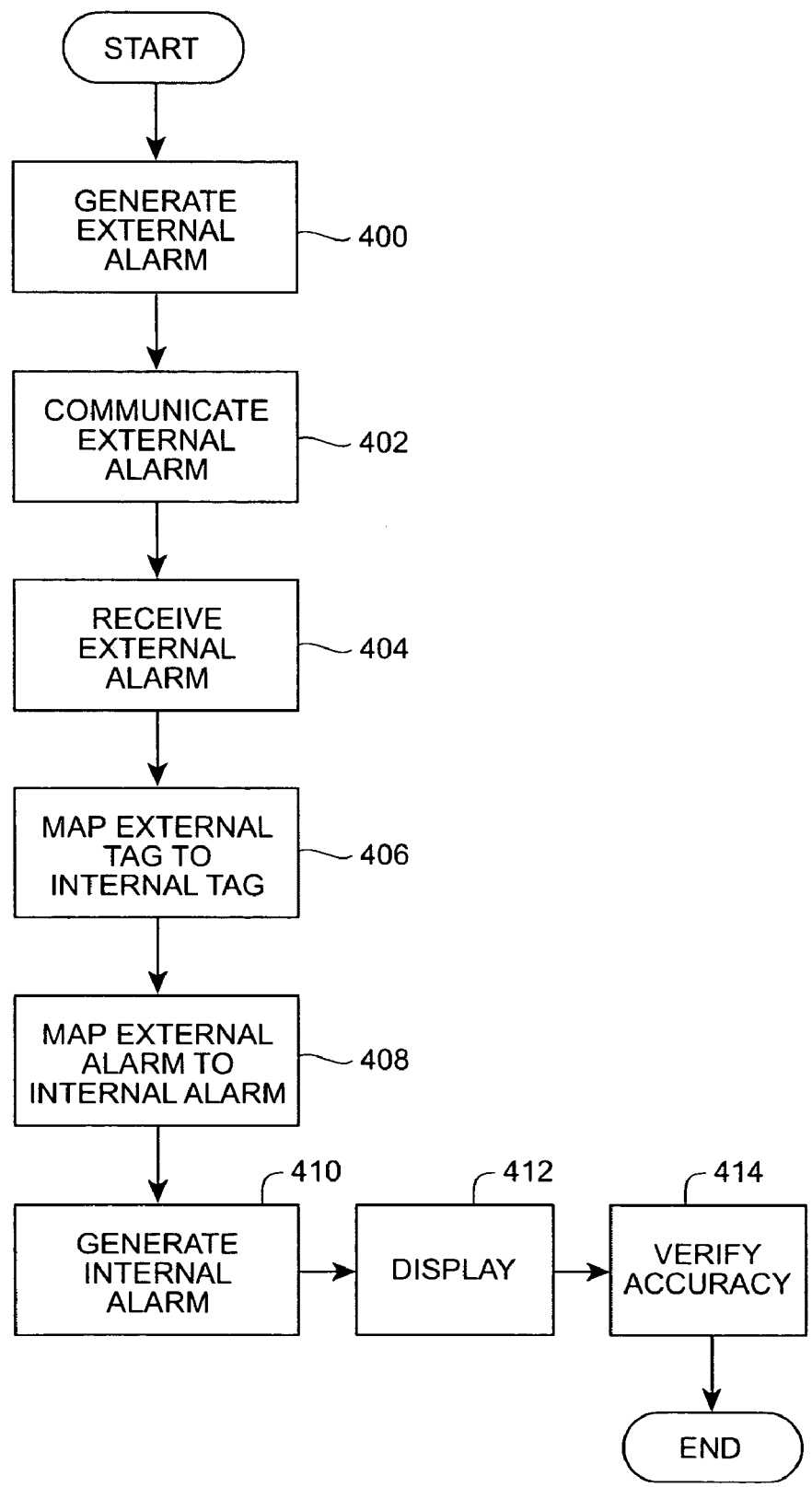
FIG. 4 is a flow chart illustrating operation of an alarm integration system of the process control system according to one embodiment of the present disclosure.

FIG. 4 is a flow chart illustrating a method of converting external alarms 115 to internal alarms 135 according to one embodiment of the present disclosure. The method begins at block 400 where the external system 114 generates the external alarm 115 with the appropriate external tag 200 for the field device 140 or 142 associated with the external alarm 115. Next, at block 402, the external system 114 communicates the external alarm 115 to controller 124. Then, at block 404, the controller 124 receives the external alarm 115 using suitable techniques, such as polling the alarm portion 123 or directly receiving the external alarm 115 over the bus 122.

Proceeding to block 406, the controller 124 hands the external alarm 115 to the alarm handler 204 for mapping to an internal tag 202 and an internal alarm 135. Next, at block 410, alarm handler 204 generates the internal alarm 135 using the integration portion 214. In one embodiment, the integration portion 214 searches map 210 for matches to the received external alarm 115 to determine the related internal alarm 135. The integration portion 214 also searches the map 210 for a match to the external tag 200 associated with the external alarm 115. The integration portion 214 then generates one or more internal alarms 135 based on the matches found in the map 210. Then, at block 412, the display routine 212 displays the generated internal alarm 135 on the workstation 116. Next, at block 414, active internal alarms 135 based on external alarms 115 are verified to ensure proper representation within the control system 112. For example, a previously active external alarm 115 may no longer be active, and the alarm state of the corresponding internal alarm 135 is suitably updated. Verification allows the process control system 112 to provide current and accurate information to the operators regarding the external system 114. Loss of communications between the process control system 112 and the external system 114 may also be detected at block 314. Loss of communication may be handled in a suitable manner. For example, the internal alarms 135 based on external alarms 115 may be cleared and a communications error generated to indicate that communications were lost. For another example, the process control system 112 may continue to maintain the internal alarms 135 that are based on external alarms 115, but mark the internal alarms 135 as unreliable due to loss of communication with the external system 114.

Figure 5:
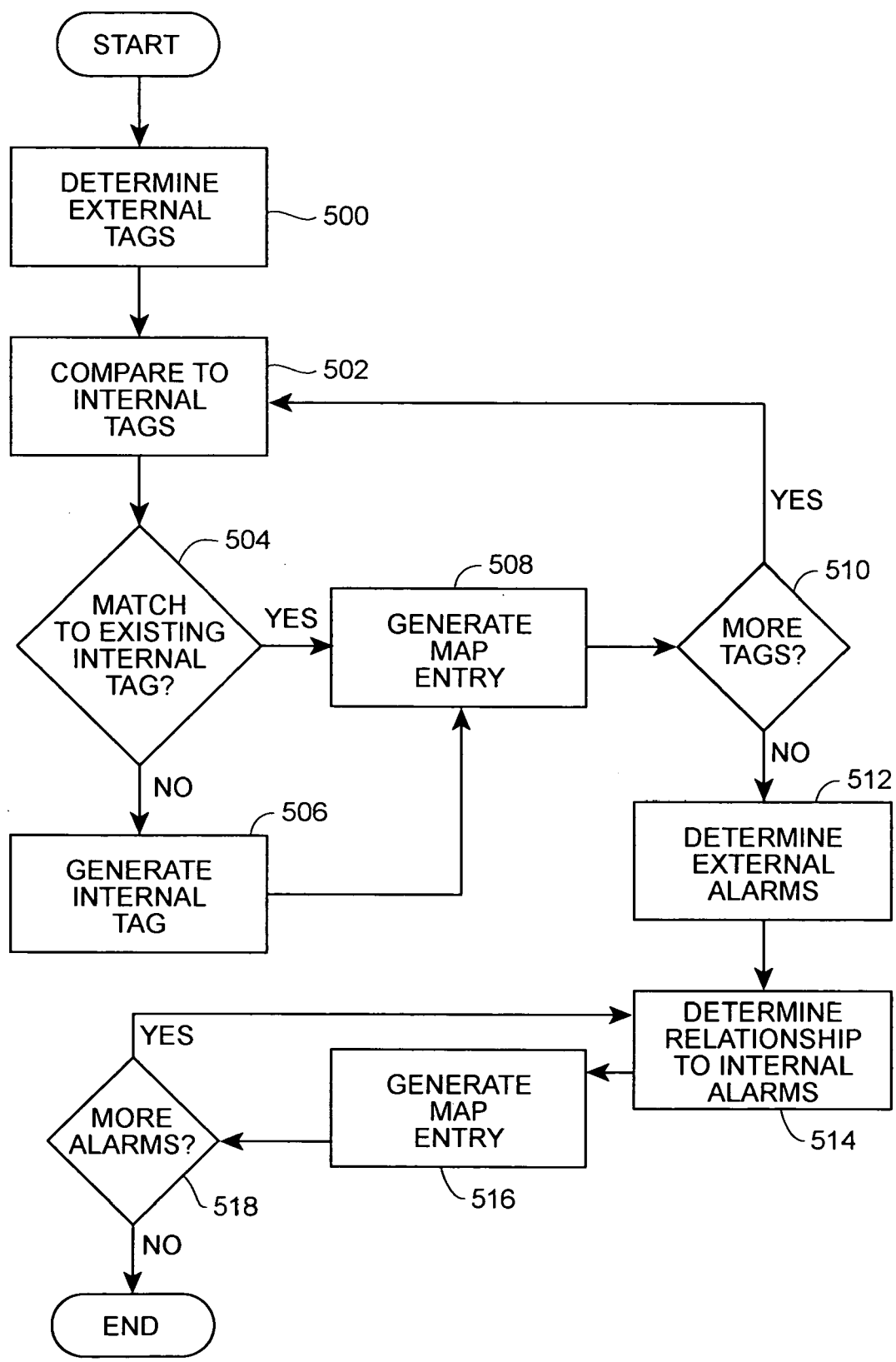
FIG. 5 is a flowchart illustrating a method of operation of a map application for generating one or more entries in an alarm map of the process control system according to one embodiment of the present disclosure.

FIG. 5 is a flowchart illustrating a method of operation of the map application 220 for generating entries 216 in the map 210 according to one embodiment of the present disclosure. The method begins at block 500 where the location of the external alarms 115 is indicated to the map application 220 and the map application 220 determines external tags 200 to be mapped into internal tags 202. The map application 220 may also determine the logical or physical location of the external tags 200. For example, the external tags 220 may follow a particular naming convention that indicate the location of the field device 140 or 142 associated with the external tag 220 within the plant 110. For another example, the external tags 220 may follow a particular naming convention that indicates the logical relationship between the various external tags 220. The external tags 200 to be mapped into internal tags 202 may comprise all or a subset of the total number of external tags 200 associated with the external system 114. For example, the external system 114 may use tags that will never be associated with alarms and the map application 220 may exclude such tags as being unimportant to the alarm handler 204. Another example includes the map application 220 being instructed to only map certain external tags that are of importance to the process control system 112. In general, the map application 220 may use suitable criteria, which may be configured by a user or operator of system 112, to select particular external tags 200 for mapping into internal tags 202.

The map application 220 may use any suitable automatic and/or manual technique or techniques, either singly or in any suitable combination, to determine the external tags 200 to be mapped into the internal tags 202. For example, the map application 220 may understand the format of configuration files associated with the external system 114, such as CSi vibration monitoring equipment to determine the available external tags 200. Another example includes the map application 220 scanning the alarm portion 123 to determine external tags 200 associated with the external system 114. For yet another example, the map application 220 may ask a user or operator to assist the map application 220 in determining the available external tags 200.

Then, at block 502, the map application 220 compares the external tags 200 to the internal tags 202 and, at decisional block 504, determines whether a match has been made between one or more internal tags 202 and one or more external tags 200. The map application 220 may compare the tags based on exact matches, partial matches, heuristics, rules, standards and/or other suitable criteria, either alone or in suitable combination. For example, the map application 220 may know of the particular naming conventions of a particular external system and use that information to match up internal and external tags 202 and 200. For another example, the map application 220 may use information about the field devices 140 and 142 monitored by the external system 114 and the internal tags 202 associated with such field devices 140 and 142 to assist the map application 220 in determining relationship between internal and external tags 202 and 200. The map application 220 may also ask a user and/or operator for assistance in resolving the relationship between the internal and external tags 202 and 200, such asking the operator to manually indicate the relationship between the internal and external tags 202 and 200.

If a no match is found between one or more external tags 200 and the internal tags 202, then the NO branch of decisional block 504 leads to block 506. At block 506, a new internal tag 202 is generated to correspond to one or more of the unmatched external tags 200 using any suitable technique. For example, the map application 220 may request controller 124 to generate a new tag or the map application 220 may generate a new tag directly. For another example, a user or operator may be asked to manually generate a new tag. The method then proceeds to block 508 for generation of appropriate map entries 216.

Returning to decisional block 504, if one or more matches are found between the internal and external tags 202 and 200, then the YES branch of decisional block 504 leads to block 508. At block 508, the map application 220 generates and/or modifies one or more new map entries 216 based on the matched internal and external tags 202 and 200. The entries 216 are generated to store the relationship between the matched internal and external tags 202 and 200. The particular number of entries generated for a particular match or set of matches depends on the particular embodiment of the present disclosure and the particular relationships between the internal and external tags 202 and 200. For example, multiple external tags 200 may map to a single internal tag 202, such as when a single field device 140 or 142 controlled by the process control system 112 is represented by multiple external tags 202, such as vibration monitoring equipment with multiple monitoring points. For another example, a single field device 140 or 142 may have a single external tag 200 while multiple internal tags 202 are used to identify the field device. In the one-to-multiple relationships, multiple one-to-one entries 216 and/or one or more one-to-multiple entries 216 may be created to represent the relationships between the internal and external tags 202 and 200 as suitable. In general, one-to-one, one-to-many, many-to-one and/or many-to-many relations may be represented by entries 216 as suitable.

Proceeding to decisional block 510, the map application 220 determines whether any more internal and external tags 202 and 200 remain to be compared and matched. If more tags remain to be compared and matched, then the YES branch of decisional block 510 returns to block 502. If no more tags remain to be compared and matched, then the NO branch of decisional block 510 leads to block 512.

At block 512, the map application 220 determines the external alarms 115 to be mapped into internal alarms 135. The external alarms 115 to be mapped into internal alarms 135 may comprise all or a subset of the total number of external alarms 115 associated with the external system 114. For example, the external system 114 may generate alarms that will never be used with the process control system 112 and the map application 220 may exclude such alarms.

The map application 220 may use any suitable automatic and/or manual technique or techniques, either singly or in suitable combination, to determine the external alarms 115 to be mapped into the internal alarms 135. For example, the map application 220 may understand the format of configuration files associated with the external system 114, such as CSi vibration monitoring equipment, to determine the available external alarms 115. For another example, the map application 220 may scan the alarm portion 123 to determine external alarms 115 associated with the external system 114. For yet another example, the map application 220 may ask a user to assist the map application 220 in determining the available external alarms 115 manually. Also, a user may set one or more default alarm priorities to be associated with the external alarms 115 from a particular external system 114. The default alarm priority may apply to all external alarms 115 from the particular external system 114, or only to external alarms 115 of a particular type or types. For example, failure alarms may have one default priority, while maintenance alarms may have a different default priority. The default priority is applied to the internal alarm 135 generated from the appropriate external alarm 115.

Then, at block 514, the map application determines the relationship between the internal and external alarms 135 and 115. The map application 220 may compare the alarms based on exact matches, partial matches, heuristics, rules, standards and/or other suitable criteria, either alone or in suitable combination. For example, the map application 220 may know of the particular alarm conventions of a particular external system and use that information to match up internal and external alarms 135 and 115. For another example, the map application 220 may use information about the field devices 140 and 142 monitored by the external system 114 and the types of alarms typically associated with such field devices 140 and 142 to assist the map application 220 in determining relationship between internal and external alarms 135 and 115. The map application 220 may also ask a user and/or operator for assistance in resolving the relationship between the internal and external tags alarms 135 and 115, such asking the operator to manually indicate the relationship between the internal and external alarms 135 and 115.

Proceeding to block 516, one or more map entries 216 may be generated and/or modified based on the relationships determined in block 514. Each entry 216 may represent a one-to-one relationship between an internal alarm 135 and an external alarm 115. As used herein, each means every one of at least a subset of the items. Alternatively or in addition, each entry 216 may represent a many-to-one, a one-to-many and/or a many-to-many relationship between the internal alarms 135 and the external alarms 115. For example, a single external alarm 115 may map into a single internal alarm 135. For another example, multiple external alarms 115 may map into a single internal alarm 135. The multiple external alarms 115 may be distinguished, for example, by different descriptions associated with the single internal alarm 135.

The map application 220 may also determine that some external alarms 115 have no current analog within the process control system 112 and generate one or more new internal alarms 135 to be associated with the unmatched external alarms 115. The new internal alarms 135 may be generated using any suitable technique for the process control system 112. For example, the map application 220 may request that the controller 124 or some other application on workstation 116 generate the new internal alarm 135.

Next, at decisional block 518, the map application 220 determines whether more external alarms 115 remain to be mapped. If no more external alarms 115 are to be mapped into internal alarms 135, then the NO branch of decisional block 518 is followed and the method ends. If more external alarms 115 remain to be mapped, then the YES branch of decisional block 518 returns to step 514.

While various methods and procedures have been described in association with the present disclosure, such methods and procedures should not be read to limit or restrict the operation or use of the present disclosure to such methods and procedures. Numerous variations and re-orderings of the methods and procedures described herein may be possible in various embodiments of the present disclosure, and the illustrated flowcharts merely illustrate one possible ordering of the blocks in the flowchart, particular embodiments and implementations may use different orderings as appropriate.

Although certain apparatus constructed in accordance with the teachings of the invention have been described herein, the scope of coverage of this patent is not limited thereto. On the contrary, this patent covers all apparatuses, methods and articles of manufacture of the teachings of the invention fairly falling within the scope of the appended claims either literally or under the doctrine of equivalents.

What is claimed is:

1. A method for integrating internal alarms generated by a process control system and external alarms generated by external equipment that is not a part of the process control system comprising:
   receiving, at the process control system, an external alarm, the external alarm including an external tag identifying an origin of the external alarm;
   pre-determining and mapping an internal alarm associated with the external alarm;
   pre-determining an internal tag associated with the external tag based on the mapping; and
   generating, at the process control system, the internal alarm when the external alarm is received.

2. The method according to claim 1, wherein receiving the external alarm comprises retrieving the external alarm from a log file.

3. The method according to claim 1, wherein receiving the external alarm comprises receiving the external alarm over a communications link.

4. The method according to claim 1, wherein determining the internal alarm comprises:
   comparing the external alarm to at least one entry associated with the mapping;
   determining a match between the external alarm and a selected one of the entries; and
   selecting the internal alarm based on the selected-one of the entries.

5. The method according to claim 1, wherein determining the internal tag comprises:
   comparing the external tag to at least one entry associated with the mapping;
   determining a match between the external alarm and a selected one of the entries; and
   selecting the internal tag based on the selected one of the entries.

6. The method according to claim 1 and further comprising:
   determining a priority associated with the internal alarm based on the external alarm;
   displaying the internal alarm at the process control system; and
   handling, by an operator, the internal alarm at the process control system.

7. The method according to claim 6 and further comprising updating the external alarm at the external system based on the handling of the related internal alarm at the process control system.

8. A system for integrating internal alarms generated by a process control system and external alarms generated by external equipment that is not a part of the process control system comprising:
   software encoded on a computer readable medium and operable to:
      receive, at the process control system, an external alarm, the external alarm including an external tag identifying an origin of the external alarm;
      pre-determine and map an internal alarm associated with the external alarm;
      pre-determine an internal tag associated with the external tag based on the map; and
      generate, at the process control system, the internal alarm when the external alarm is received.

9. The system according to claim 8, wherein receiving the external alarm comprises retrieving the external alarm from a log file.

10. The system according to claim 8, wherein receiving the external alarm comprises receiving the external alarm over a communications link.

11. The system according to claim 8, wherein determining the internal alarm comprises the software being further operable to:
   compare the external alarm to at least one entry in the map;
   determine a match between the external alarm and a selected one of the entries; and
   select the internal alarm based on the selected one of the entries.

12. The system according to claim 8, wherein determining the internal tag comprises the software being further operable to:
   compare the external tag to at least one entry in the map;
   determine a match between the external alarm and a selected one of the entries; and
   select the internal tag based on the selected one of the entries.

13. The system according to claim 8 and further comprising the software being further operable to:
   determine a priority associated with the internal alarm based on the external alarm;
   display the internal alarm at the process control system; and
   handle, by an operator, the internal alarm at the process control system.

14. The system according to claim 13 and further comprising the software being further operable to update the external alarm at the external system based on the handling of the related internal alarm at the process control system.

15. A system for integrating internal alarms generated by a process control system and external alarms generated by external equipment that is not a part of the process control system comprising:
   means for receiving, at the process control system, an external alarm, the external alarm including an external tag identifying an origin of the external alarm;
   means for pre-determining and mapping an internal alarm associated with the external alarm;
   means for pre-determining an internal tag associated with the external tag based on the mapping; and
   means for generating, at the process control system, the internal alarm when the external alarm is received.

16. A method for generating alarm and tag relations comprising:
   selecting at least one external tag associated with an external system;

determining at least one internal tag related to the external tags, the internal tag being associated with a process control system;

generating at least one entry in a map indicating a relation between at least one of the external tags and at least one of the internal tags;

selecting at least one external alarm associated with the external system;

determining at least one internal alarm related to the external alarms, the internal alarm being associated with the process control system; and generating at least one entry in the map indicating a relation between at least one of the external alarms and at least one of the internal alarms.

17. The method according to claim 16, wherein the external tags are selected based on predetermined criteria.

18. The method according to claim 17, wherein the predetermined criteria comprises external tags to be monitored by the process control system.

19. The method according to claim 16, wherein determining the internal tags related to the external tags comprises:
determining a match between at least one of the external tags and at least one of the internal tags; and
selecting the internal tags that are matched to the external tags.

20. The method according to claim 19, wherein the match is determined based on any of a heuristic, an exact match, a partial match or a user determined match.

21. The method according to claim 16, wherein the external alarms are selected based on predetermined criteria.

22. The method according to claim 21, wherein the predetermined criteria comprises external alarms to be monitored by the process control system.

23. The method according to claim 16, wherein determining the internal alarms related to the external alarms comprises:
determining a match between at least one of the external alarms and at least one of the internal alarms; and
selecting the internal alarms that are matched to the external alarms.

24. The method according to claim 23, wherein the match is determined based on any of a heuristic, an exact match, a partial match or a user determined match.

25. A system for generating alarm and tag relations comprising:
software encoded on a computer readable medium and operable to:
select at least one external tag associated with an external system;
determine at least one internal tag related to the external tags, the internal tag being associated with a process control system;
generate at least one entry in a map indicating a relation between at least one of the external tags and at least one of the internal tags;
select at least one external alarm associated with the external system;
determine at least one internal alarm related to the external alarms, the internal alarm being associated with the process control system; and
generate at least one entry in the map indicating a relation between at least one of the external alarms and at least one of the internal alarms.

26. The system according to claim 25, wherein the external tags are selected based on predetermined criteria.

27. The system according to claim 26, wherein the predetermined criteria comprises external tags to be monitored by the process control system.

28. The system according to claim 25, wherein determining the internal tags related to the external tags comprises the software being further operable to:
determine a match between at least one of the external tags and at least one of the internal tags; and
select the internal tags that are matched to the external tags.

29. The system according to claim 28, wherein the match is determined based on any of a heuristic, an exact match, a partial match or a user determined match.

30. The system according to claim 25, wherein the external alarms are selected based on predetermined criteria.

31. The system according to claim 30, wherein the predetermined criteria comprises external alarms to be monitored by the process control system.

32. The system according to claim 25, wherein determining the internal alarms related to the external alarms comprises the software being further operable to:
determine a match between at least one of the external alarms and at least one of the internal alarms; and
select the internal alarms that are matched to the external alarms.

33. The system according to claim 32, wherein the match is determined based on any of a heuristic, an exact match, a partial match or a user determined match.

34. A system for generating alarm and tag relations comprising:
means for selecting at least one external tag associated with an external system;
means for determining at least one internal tag related to the external tags, the internal tag being associated with a process control system;
means for generating at least one entry in a map indicating a relation between at least one of the external tags and at least one of the internal tags;
means for selecting at least one external alarm associated with the external system;
means for determining at least one internal alarm related to the external alarms, the internal alarm being associated with the process control system; and
means for generating at least one entry in the map indicating a relation between at least one of the external alarms and at least one of the internal alarms.

* * * * *

UNITED STATES PATENT AND TRADEMARK OFFICE
CERTIFICATE OF CORRECTION

PATENT NO. : 7,030,747 B2
APPLICATION NO. : 10/787383
DATED : April 18, 2006
INVENTOR(S) : Cindy Scott et al.

It is certified that error appears in the above-identified patent and that said Letters Patent is hereby corrected as shown below:

At Column 4, line 4, "18" should be -- 118 --.

At Column 5, line 22, "1-14" should be -- 114 --.

At Column 6, line 52, "a" should be -- an --.

At Column 11, line 8, "such asking" should be -- such as asking --.

At Column 11, line 10, "If a no" should be -- If no --.

At Column 12, line 34, "such asking" should be -- such as asking --.

In the Claims:

At Column 13, line 45, "selected-one" should be -- selected one --.

Signed and Sealed this

Thirteenth Day of March, 2007

JON W. DUDAS
*Director of the United States Patent and Trademark Office*